US011082640B2

(12) United States Patent
 Nagata et al.

(10) Patent No.: US 11,082,640 B2
(45) Date of Patent: Aug. 3, 2021

(54) INFRARED CAMERA

(71) Applicant: Mitsubishi Electric Corporation, Tokyo (JP)

(72) Inventors: Hideo Nagata, Tokyo (JP); Hiroshi Sakanoue, Tokyo (JP); Takafumi Hara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 803 days.

(21) Appl. No.: 15/478,295

(22) Filed: Apr. 4, 2017

(65) Prior Publication Data

US 2018/0131879 A1    May 10, 2018

(30) Foreign Application Priority Data

Nov. 8, 2016  (JP) .............................. JP2016-217759

(51) Int. Cl.
 *H04N 5/33* (2006.01)
 *H04N 5/225* (2006.01)
 (Continued)

(52) U.S. Cl.
 CPC ................ *H04N 5/33* (2013.01); *G01J 5/061* (2013.01); *G02B 5/003* (2013.01); *G02B 7/028* (2013.01);
 (Continued)

(58) Field of Classification Search
 None
 See application file for complete search history.

(56) References Cited

U.S. PATENT DOCUMENTS

2013/0070102 A1*  3/2013  Gustafson ................ H04N 5/33
                                              348/164
2015/0160536 A1*  6/2015  Lang ...................... G03B 17/55
                                              348/374
(Continued)

FOREIGN PATENT DOCUMENTS

CN   108700795 A   * 10/2018   ......... G02B 27/0006
GB   2258726 A       2/1993
(Continued)

OTHER PUBLICATIONS

Communication dated Sep. 5, 2017, from the Japanese Patent Office in counterpart application No. 2016-217759.
(Continued)

*Primary Examiner* — William C Vaughn, Jr.
(74) *Attorney, Agent, or Firm* — Sughrue Mion, PLLC; Richard C. Turner

(57) ABSTRACT

An infrared camera includes a lens unit including a lens and a lens barrel, a heater that is provided at the lens unit and heats the lens, an infrared image sensor that captures an image using infrared light focused by the lens, a chassis that is fixed to an external surface side of the lens barrel while being thermally insulated from the lens unit and contains the infrared image sensor, and a light-blocking member that is located between the lens barrel and the infrared image sensor inside the chassis as viewed in a direction of an optical axis of the lens and blocks infrared light radiated toward the infrared image sensor and coming without passing through the lens, thus reducing the influence of infrared light coming without passing through the lens on capturing of an image.

13 Claims, 4 Drawing Sheets

(51) Int. Cl.
    *G01J 5/06*           (2006.01)
    *G02B 5/00*          (2006.01)
    *G02B 7/02*          (2021.01)

(52) U.S. Cl.
    CPC ...... *H04N 5/2254* (2013.01); *G01J 2005/068* (2013.01)

(56) References Cited

U.S. PATENT DOCUMENTS

| | | | |
|---|---|---|---|
| 2016/0231527 A1* | 8/2016 | Tremblay | G01J 5/12 |
| 2016/0373624 A1* | 12/2016 | Imai | A61B 1/00 |
| 2017/0118418 A1* | 4/2017 | Wang | H04N 5/332 |
| 2018/0176431 A1* | 6/2018 | Kim | H05K 1/0201 |
| 2018/0180972 A1* | 6/2018 | Sugiura | G03B 13/36 |
| 2018/0343369 A1* | 11/2018 | Kim | G03B 3/10 |

FOREIGN PATENT DOCUMENTS

| | | | |
|---|---|---|---|
| JP | 04-247421 A | | 9/1992 |
| JP | 04247421 A | * | 9/1992 |
| JP | 2010133869 A | | 6/2010 |
| JP | 2015-014581 A | | 1/2015 |
| JP | 2015014581 A | * | 1/2015 |

OTHER PUBLICATIONS

Communication dated Feb. 17, 2021, from the German Patent and Trademark Office in application No. 102017209412.5.

* cited by examiner

INFRARED CAMERA

BACKGROUND OF THE INVENTION

1. Field of the Invention

The present invention relates to an infrared camera that captures an image using infrared light radiated from an object.

2. Description of the Related Art

An infrared camera, which includes a lens and a chassis, is used with the lens exposed on the outside of the chassis. Therefore, in a case where the infrared camera is used outdoors, since the lens is exposed to the air, the infrared camera is susceptible to the weather. For example, when the outside air temperature reaches sub-zero, the temperature of the lens becomes low, so that phenomena may occur, such as freezing of the lens surface, attachment of frost onto the lens surface, and deposition of snow on the lens surface in the case of snowfall. The occurrence of such phenomena may block a field of view of the lens of the infrared camera, thus hindering image capturing.

As a countermeasure against the low temperature of the lens, a technique of providing the infrared camera with a heater to heat the lens has been proposed (for example, Patent Literature 1).

[Patent Literature 1] JP-A-2015-14581

For example, in an imaging apparatus disclosed in Patent Literature 1, an image sensor detects infrared light from a subject, which is focused by the lens, so that the detected infrared light is displayed as an image. However, in such a configuration, the acquired image may be the one affected by infrared light coming from other than the subject. In other words, the image sensor may detect infrared light radiated from the imaging apparatus itself, including the chassis and the lens unit, to produce an output.

Furthermore, the imaging apparatus discussed in Patent Literature 1 has a configuration in which a lens unit is heated by the heater to prevent the lens from freezing. However, on the other hand, infrared light radiated from the lens unit heated by the heater increases, and the heat of the lens unit as heated is transferred to the chassis to increase infrared radiation inside the chassis, so that infrared light radiated from other than the subject may influence a captured image, thus deteriorating the precision of image capturing.

SUMMARY OF THE INVENTION

The invention has been made in view of situations such as those mentioned above, and has an object to provide an infrared camera capable of reducing unnecessary infrared light, serving as disturbance, that is incident on an infrared image sensor and obtaining an appropriate output from the infrared image sensor, by, while driving a heater to remove snow or frost attached to the lens surface so as to retain the field of view of the infrared camera, avoiding a rise in temperature inside the infrared camera caused by the operation of the heater and providing a configuration of blocking unnecessary infrared light inside a chassis.

An infrared camera according to the invention includes a lens unit including a lens that focuses infrared light and a lens barrel that holds the lens, a heater that is provided at the lens unit and heats the lens, an infrared image sensor that captures an image using infrared light focused by the lens, a chassis that is fixed to an external surface side of the lens barrel while being thermally insulated from the lens unit and contains the infrared image sensor, and a light-blocking member that is located between the lens barrel and the infrared image sensor inside the chassis as viewed in a direction of an optical axis of the lens and blocks infrared light radiated toward the infrared image sensor and coming without passing through the lens.

The infrared camera according to the invention has a configuration in which the chassis is thermally isolated from the heater and unnecessary infrared light coming without passing through the lens is blocked by the light-blocking member, and is, therefore, capable of reducing an influence of unnecessary infrared light on an infrared image that is captured by the infrared image sensor.

The foregoing and other objects, features, aspects and advantages of the invention will become more apparent from the following detailed description of the present invention when taken in conjunction with the accompanying drawings.

DETAILED DESCRIPTION OF THE PREFERRED EMBODIMENTS

First Embodiment

Figure 1:
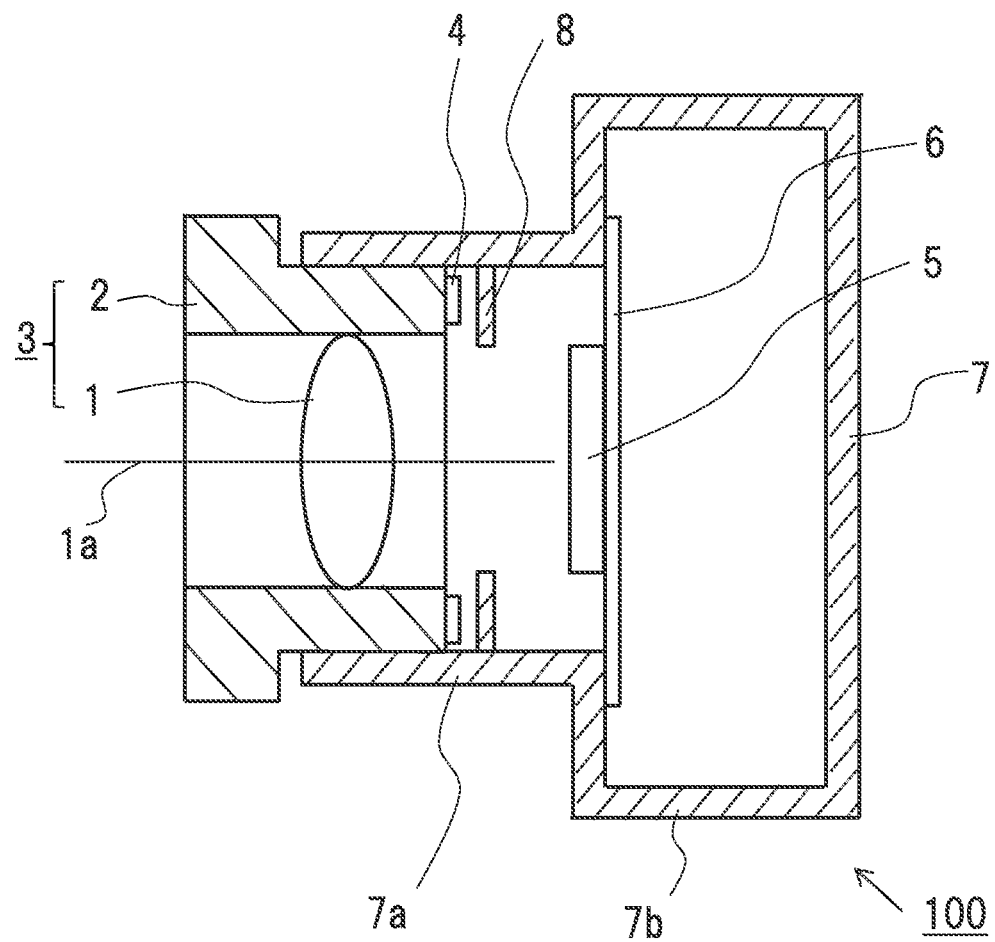
FIG. 1 is a sectional side view of an infrared camera according to a first embodiment of the invention.

An infrared camera 100 according to a first embodiment of the invention is described with reference to FIG. 1. FIG. 1 is a sectional side view taken along the direction of an optical axis 1a of a lens 1 of the infrared camera 100 (an infrared camera module), and illustrates the orientation taken at the time of capturing the image of a subject located at the left-hand side of the plane of FIG. 1.

As illustrated in FIG. 1, the infrared camera 100 according to the invention includes a lens unit 3, which includes a lens 1 for focusing infrared light to form an image and a cylindrical lens barrel 2 that holds an outer circumference portion of the lens 1. The optical axis 1a of the lens 1 is located in agreement with the central line of the lens barrel 2.

Then, a heater 4 for heating the lens 1 is mounted in such a way as to be in contact with the lens unit 3. In the example illustrated in. FIG. 1, the heater 4 is located at the end surface portion of the lens barrel 2 of the lens unit 3. An infrared image formed by the lens 1 is converted into an electrical signal by an infrared image sensor 5, which is contained in a chassis 7 via a circuit board 6.

The chassis 7 is configured mainly with a tubular portion 7a, which holds the lens unit 3, and a main body portion 7b, which holds the infrared image sensor 5. Then, the lens unit 3 is fixed to the internal surface side of the tubular portion 7a of the chassis 7 in such a manner that the external surface of the lens barrel 2 of the lens unit 3 is in contact with the internal surface of the tubular portion 7a of the chassis 7.

Here, while the chassis 7 is in a state of being thermally insulated from the lens unit 3, more specifically, the chassis 7 itself is configured with a member having a high heat insulation property (a heat-insulating member), such as a resin material, thus acquiring a configuration of actively heating the lens 1 and enabling thermal insulation from the lens barrel 2.

Moreover, the infrared camera 100 according to the first embodiment includes a light-blocking member 8 between the lens barrel 2 and the infrared image sensor 5 inside the tubular portion 7a of the chassis 7 as viewed in the direction of the optical axis 1a of the lens 1. The light-blocking member 8 is arranged to block infrared light that is radiated toward the infrared image sensor 5 from the lens barrel 2 and the tubular portion 7a of the chassis 7, which are located at the outer circumference portion of the lens 1, and that comes without passing through the lens 1 (unnecessary infrared light). Furthermore, since the heater 4 is provided at the lens barrel 2, unnecessary infrared light radiated from the heater 4 is deemed to be a part of unnecessary infrared light radiated from the lens barrel 2.

For example, the light-blocking member 8 can be formed integrally with the chassis 7, which is made from a heat-insulating member, and is formed into a shape that projects from the internal surface of the tubular portion 7a of the chassis 7 toward the optical axis 1a of the lens 1 at a predetermined height. At this time, the light-blocking member 8, which is attached to the chassis 7 thermally insulated from the heater 4, is in a state of being thermally insulated from the heater 4. Then, the light-blocking member 8 is formed, for example, in a ring shape in planar shape, so that the central opening portion thereof allows infrared light that has passed through the lens 1 to pass toward the infrared image sensor 5.

As illustrated in FIG. 1, in the infrared camera 100 according to the first embodiment, the heater 4 is mounted at the lens barrel 2, and is located at the end surface of the lens barrel 2 at the side closer to the infrared image sensor 5 as viewed in the direction of the optical axis 1a of the lens 1 in such a way as to face a light-blocking surface (a planar surface portion) of the light-blocking member 8 via an air layer. Although the heater 4 is located at the end surface of the lens barrel 2 at the side closer to the infrared image sensor 5, since the light-blocking member 8 is mounted at a position facing the heater 4, unnecessary infrared light radiated from the heater 4 toward the infrared image sensor 5 can be blocked.

Furthermore, besides a configuration in which an air layer is formed between the heater 4 and the light-blocking member 8, a configuration in which a heat-insulating member is located instead of the air layer can be employed.

Furthermore, the heat of the heater 4 is transferred to the lens barrel 2 and the chassis 7, which are located in proximity to the heater 4, and unnecessary infrared light is also radiated from the lens barrel 2 and the chassis 7 into an internal space of the tubular portion 7a of the chassis 7, but, since the light-blocking member 8 is mounted, such unnecessary infrared light is also blocked and prevented from falling on the infrared image sensor 5.

In this way, in the infrared camera 100 according to the first embodiment, the influence of a rise in temperature caused by the operation of the heater 4 can be eliminated by mounting the light-blocking member 8, and infrared light guided by the lens 1 can be used for the infrared image sensor 5 to capture a high-precision image.

Moreover, as illustrated in FIG. 1, the lens 1 is exposed on the outside of the tubular portion 7a of the chassis 7, and is in a state of being in direct contact with the air. As mentioned above, the lens unit 3 includes the lens 1 and the lens barrel 2, and the lens barrel 2 holds one or a plurality of lenses 1 and has a mounting portion used to be attached to the tubular portion 7a of the chassis 7.

In a case where the number of lenses 1 is large, it is effective to adjust the location of the heater 4 in such a way as to enable heating the outermost lens 1 exposed to the air. Moreover, the heater 4 can be provided not only at the end surface portion of the lens barrel 2 but also at a plurality of locations.

Then, the chassis 7 fixes the infrared image sensor 5 mounted on the circuit board 6, and the location of the lens 1 is adjusted at the side of the lens unit 3 in such a manner that infrared light focused by the lens 1 strikes a light receiving portion of the infrared image sensor 5 in an appropriate positional relationship with the infrared image sensor 5.

Furthermore, the heater 4 is fixed in such a way as to be in contact with the lens unit 3. The heater 4 not only can be located in contact with the end surface of the lens barrel 2 of the lens unit 3 in an attachment manner, as in the example illustrated in FIG. 1, but also can be located in such a way as to be in contact with the outer circumference portion of the lens 1.

Moreover, while FIG. 1 illustrates a case where the heater 4 is in contact with the surface of the lens barrel 2, the heater 4 can be embedded (not illustrated) in the lens barrel 2 as long as the heater 4 is able to heat the lens 1.

Here, it is desirable that the lens barrel 2 be made from a metallic member, such as aluminum, having high thermal conductivity to facilitate transferring heat to the lens 1.

Additionally, the heater 4 can be fixed to the lens unit 3 by adhesive having high thermal conductivity.

With the above-described configuration, in a case where the infrared camera 100 is used outdoors, even under a situation where the outside air temperature reaches sub-zero, even if the field of view of the infrared camera is blocked by, for example, freezing of the lens surface, attachment of frost onto the lens surface, or deposition of snow on the lens surface in the case of snowfall, heat generation of the heater 4 enables efficiently heating the lens and removing ice, frost, or snow.

Furthermore, the light-blocking member 8 is located between the lens unit 3 and the infrared image sensor 5 as viewed in the direction of the optical axis 1a of the lens 1 and functions as eaves to block infrared light serving as noise radiated from the lens barrel 2 and the chassis 7 located at the periphery of the lens 1 (unnecessary infrared light) from falling on the infrared image sensor 5. This enables reducing the influence of unnecessary infrared light other than infrared light guided by the lens 1 on the infrared image sensor 5 and obtaining an appropriate output thereof.

The advantageous effect obtained by forming the chassis 7 with a material having high heat insulation property is described as follows. When the lens unit 3 is heated by the heater 4, heat is also transferred to the chassis 7, which is in contact with the lens unit 3. However, since the heat insulation property of the chassis 7 itself is high, a rise in temperature of the chassis 7 can be reduced to a small range as compared with a case where the chassis 7 is not formed of heat-insulating material. Moreover, since the light-blocking member 8 is also attached to the chassis 7, which is thermally insulated, the light-blocking member p is brought into a state of being thermally insulated from the heater 4, so that a rise in temperature of the light-blocking member 8 caused by the heating operation of the heater 4 can be reduced. Since infrared light emitted from an object (subject) becomes larger as the temperature of the object is higher, when a rise in temperature of the chassis 7 and the light-blocking member 8 is small, the amount of infrared light radiated from these parts also becomes small. Therefore, forming the chassis 7 with a heat-insulating material and attaching the light-blocking member 8 to the chassis 7 enable reducing unnecessary infrared light serving as disturbance and obtaining an appropriate output of the infrared image sensor 5.

Here, the chassis 7 can be made from a resin material, such ac nylon, polybutylene terephthalate (PBT), polyphenylene sulfide (PPS), and liquid crystal polymer (LCP), and the light-blocking member 8 can also be made from a material similar to that of the chassis 7. When such a resin material is used, since the chassis 7 can be manufactured by, for example, an injection molding method, the cost of the chassis 7 can be more reduced in the case of mass production.

Furthermore, naturally, integrating the light-blocking member 8 with the chassis 7 enables decreasing the number of parts and thus reducing the production cost to a small value.

Second Embodiment

While, in the above-mentioned first embodiment, a case in which the chassis 7 made from a heat-insulating member is used as a constituent element of the infrared camera 100 has been described, a case in which a chassis 70 made from a heat-conducting member is used is described in a second embodiment.

Figure 2:
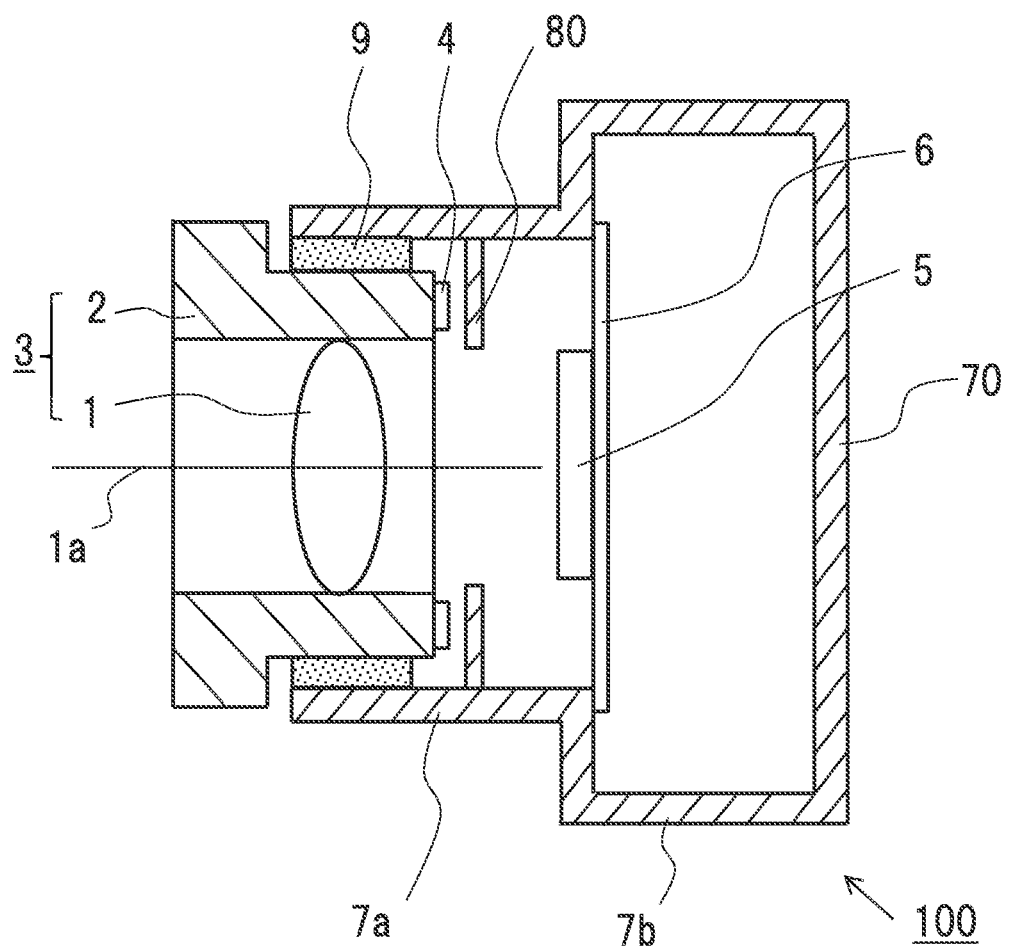
FIG. 2 is a sectional side view of an infrared camera according to a second embodiment of the invention.

FIG. 2 is a sectional side view of an infrared camera 100 according to the second embodiment of the invention. As illustrated in FIG. 2, the chassis 70 is made from a heat-conducting member. The chassis 70 is configured with a tubular portion 7a and a main body portion 7b, and a heat-insulating member 9 is mounted between the internal surface of the tubular portion 7a and the external surface of the lens barrel 2 of the lens unit 3, so that the chassis 70 is configured to be thermally insulated from the heater 4.

While the chassis 70 and a light-blocking member 80, which is formed integrally with the chassis 70, are similar in function to those of the first embodiment illustrated in FIG. 1, in the second embodiment, each of the chassis 70 and the light-blocking member 80 is made from a metallic material and is thermally isolated from the lens unit 3 by the heat-insulating member 9. Furthermore, the other constituent members are similar to those of the first embodiment. Moreover, the second embodiment is also similar to the first embodiment in that the light-blocking member 80 is mounted inside the tubular portion 7a of the chassis 70 in such a way as to block infrared light that comes without passing through the lens 1.

Next, differences from the above-mentioned first embodiment are described with respect to the infrared camera 100 according to the second embodiment as follows.

In the second embodiment, since the heat-insulating member 9 is inserted between the chassis 70 and the lens barrel 2 of the lens unit 3, even when the heater 4 generates heat and the temperature of the lens unit 3 rises, the heat is unlikely to be transferred to the chassis 70, so that a rise in temperature of the chassis 70 and the light-blocking member 80 can be reduced to a small value. On the other hand, since each of the chassis 70 and the light-blocking member 80 is made from a metallic material having good thermal conductivity, the temperature distribution in these parts is homogenized.

In other words, the chassis 70 and the light-blocking member 80 have a small rise in temperature caused by the heating operation of the heater 4 and further have a homogeneous temperature distribution.

Here, the heat-insulating member 9 can be made from a resin material, such as thermoplastic elastomer (TPE) ethylene-propylene rubber (EPDM), and epoxy resin. Moreover, the chassis 70 can be made from a metallic material having high thermal conductivity, such as aluminum, but can be made from another material.

Next, the advantageous effect obtainable by the infrared camera 100 according to the second embodiment, in which the heat-insulating member 9 is located and each of the chassis 70 and the light-blocking member 80 is made from a metallic material, is described as follows.

Even when the lens unit 3 is heated by the heater 4, as mentioned above, a rise in temperature of the chassis 70 and the light-blocking member 80 is small, and the temperature distribution in these parts is homogenized. Since infrared light emitted from an object becomes larger as the temperature of the object is higher, if a rise in temperature of the chassis 70 and the light-blocking member 80 is small and the temperature distribution is homogeneous, the amount of infrared light radiated from these parts is also small and the distribution of the amount of infrared light is also homogenized. Accordingly, the amount of unnecessary infrared light radiated from a part of these members and falling on the infrared image sensor 5 is small and the local increase and decrease of the unnecessary infrared light is also reduced, so that a more appropriate image sensor output with less fixed pattern noise can be obtained.

Furthermore, naturally, integrating the light-blocking member 80 with the chassis 70 enables decreasing the number of parts and thus reducing the production cost to a small value.

Third Embodiment

While, in the above-mentioned first embodiment, a case in which the chassis 7 is made from a heat-insulating member and the heater 4, which constitutes the infrared camera 100, is mounted at the end surface of the lens barrel 2 of the lens unit 3 on the side closer to the infrared image sensor 5 has been described, a case in which the heater 4 is located in contact with the external surface of the lens barrel 2 is described in a third embodiment.

Figure 3:
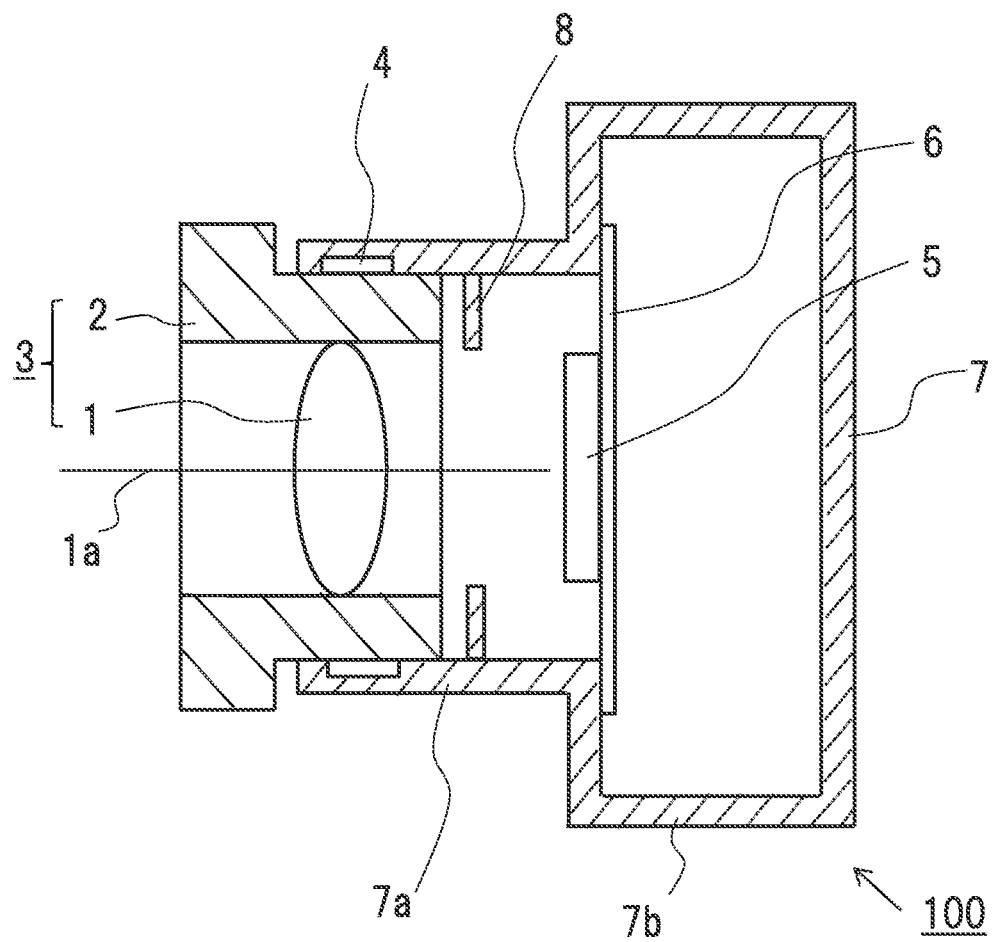
FIG. 3 is a sectional side view of an infrared camera according to a third embodiment of the invention.

FIG. 3 is a sectional side view of the infrared camera 100 according to the third embodiment, in which the heater 4 is mounted in contact with the external surface of the lens barrel 2. Moreover, the heater 4 is located in such a way as to be in contact with the internal surface of the tubular portion 7a of the chassis 7, and is held between the internal surface of the tubular portion 7a and the lens barrel 2.

Furthermore, while, in the example illustrated in FIG. 3, the heater 4 is in a state of being fitted in a recessed portion of the internal surface portion of the chassis 7, the heater 4 can be fitted in or embedded in the external surface portion of the lens barrel 2.

As mentioned above, the chassis 7 is made from a heat-insulating member. Therefore, although the heater 4 and the chassis 7 are in direct contact with each other, the heat of the heater 4 is actively conducted to the lens unit 3 and is unlikely to be transferred to the chassis 7, so that a rise in temperature is unlikely to occur in the chassis 7 and the light-blocking member 8. Therefore, unnecessary infrared light radiated from the chassis 7 and the light-blocking member 8 can be reduced to a small amount.

Furthermore, as in the above-mentioned first embodiment, since the light-blocking member 8 is mounted between the lens barrel 2 and the infrared image sensor 5 as viewed in the direction of the optical axis 1*a* so that unnecessary infrared light radiated due to the operation of the heater 4 can be blocked, the influence of a rise in temperature of the lens surrounding portion caused by the heating operation of the heater 4 can be eliminated and capturing of a good-quality infrared image can be performed.

Fourth Embodiment

While, in the above-mentioned second embodiment, a case in which the chassis 70 made from a heat-conducting member is used and the heater 4, which constitutes the infrared camera 100, is mounted at the end surface of the lens barrel 2 of the lens unit 3 on the side closer to the infrared image sensor 5 has been described, a case in which the chassis 70 made from a heat-conducting member is used and the heater 4 is located in contact with the external surface of the lens barrel 2 is described in a fourth embodiment.

Figure 4:
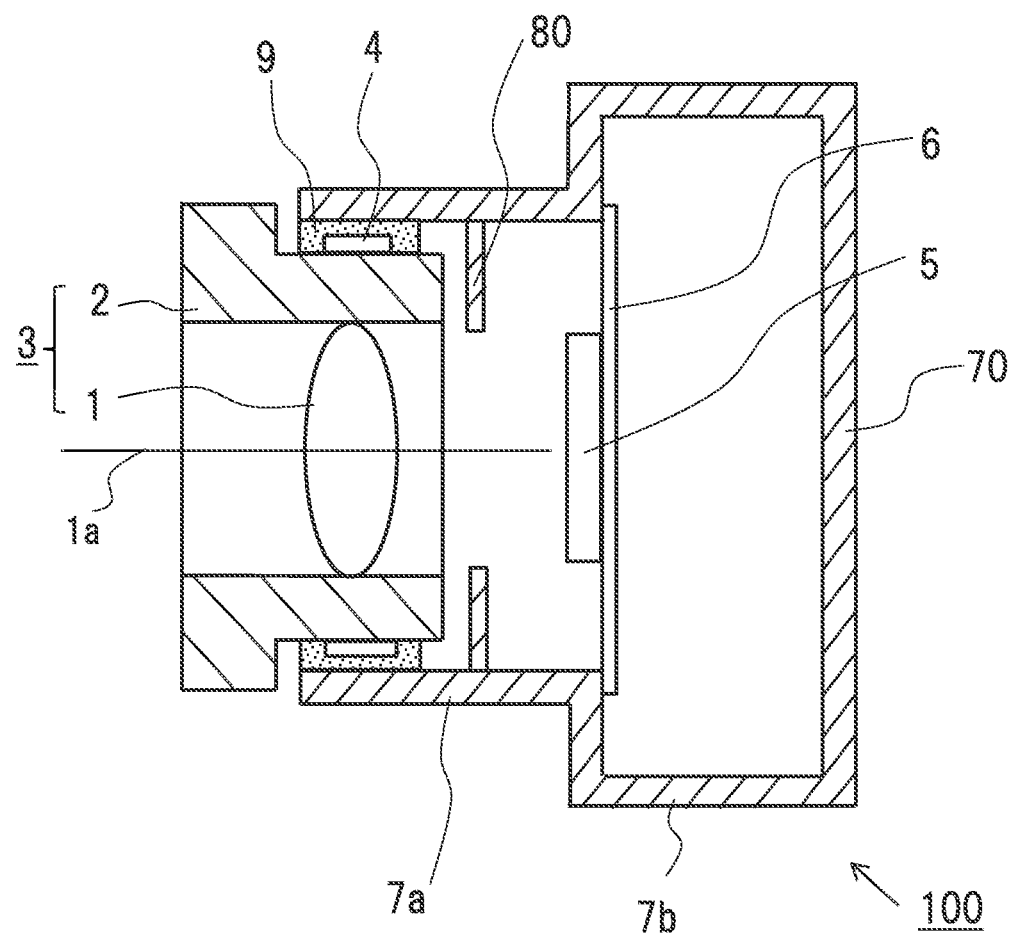
FIG. 4 is a sectional side view of an infrared camera according to a fourth embodiment of the invention.

FIG. 4 is a sectional side view of the infrared camera 100 according to the fourth embodiment, in which the heater 4 is mounted in a state of being in contact with the external surface of the lens barrel 2. Then, the heater 4 is located at the internal surface side of the tubular portion 7*a* of the chassis 70, which is a heat-conducting member, via the heat-insulating member 9, and is held between the internal surface side of the tubular portion 7*a* and the lens barrel 2.

As mentioned above, the chassis 70 is made from a heat-conducting member. Therefore, as in the second embodiment, since the heater 4 and the chassis 70 are located via the heat-insulating member 9, the heat of the heater 4 is unlikely to be transferred to the chassis 70 and a rise in temperature is unlikely to occur in the chassis 70 and the light-blocking member 80, so that unnecessary infrared light radiated from the chassis 70 and the light-blocking member 80 can be reduced to a small amount.

Furthermore, as in the above-mentioned second embodiment, since unnecessary infrared light radiated due to the operation of the heater 4 can be blocked by the light-blocking member 80, the influence of a rise in temperature of the lens surrounding portion caused by the heating operation of the heater 4 can be eliminated and capturing of a good-quality infrared image can be performed.

Furthermore, naturally, the heater 4 is not only held between the lens barrel 2 and the chassis 7 (or 70) but also can be, for example, located on the external surface of the lens barrel 2 without being sandwiched between the external surface of the lens barrel 2 and the chassis 7 (or 70), can be mounted in a state of being embedded in the lens barrel 2, or can be mounted at the internal surface side of the lens barrel 2.

Furthermore, the invention can be implemented by, within the scope of the invention, optionally combining some or all of the embodiments or modifying or omitting a component or components of each embodiment as appropriate.

Various modifications and alterations of the invention will be apparent to those skilled in the art without departing from the scope and spirit of the invention, and it should be understood that the invention is not limited to the illustrative embodiments set forth herein.

What is claimed is:

1. An infrared camera comprising:
   a lens unit including a lens that focuses infrared light and a lens barrel that holds the lens;
   a heater that is provided at the lens unit and heats the lens;
   an infrared image sensor that captures an image using infrared light focused by the lens;
   a chassis that is fixed to an external surface side of the lens barrel while being thermally insulated from the lens unit and contains the infrared image sensor; and
   a light-blocking member that is located between the lens barrel and the infrared image sensor inside the chassis as viewed in a direction of an optical axis of the lens and blocks infrared light radiated toward the infrared image sensor and coming without passing through the lens,
   wherein the light-blocking member which is fixed to an internal surface side of the chassis, is in a state of being thermally insulated from the heater.

2. The infrared camera according to claim 1, wherein the light-blocking member blocks infrared light radiated from the lens barrel and the chassis.

3. The infrared camera according to claim 1, wherein the chassis is made from a heat-insulating member.

4. The infrared camera according to claim 1, wherein the chassis is made from a heat-conducting member, and is mounted at the external surface side of the lens barrel via a heat-insulating member.

5. The infrared camera according to claim 1, wherein the light-blocking member is of such a shape as to project from an internal surface of the chassis toward the optical axis of the lens, and is provided integrally with the chassis.

6. The infrared camera according to claim 1, wherein the heater is provided at the lens barrel.

7. The infrared camera according to claim 1, wherein the heater is provided at an end surface of the lens barrel on a side closer to the infrared image sensor as viewed in the direction of the optical axis of the lens in such a way as to face a light-blocking surface of the light-blocking member.

8. The infrared camera according to claim 1, wherein the heater is provided in contact with an external surface of the lens barrel.

9. The infrared camera according to claim 8, wherein the heater is provided at an internal surface side of the chassis, and is held between the lens barrel and the chassis.

10. The infrared camera according to claim 1, wherein the chassis is made from a resin material.

11. The infrared camera according to claim 1, wherein the chassis is made from a metallic material.

12. The infrared camera according to claim 1, wherein the light-blocking member has a planar ring shape.

13. The infrared camera according to claim 1, wherein an air layer is formed between the heater and the light-blocking member.

* * * * *